July 10, 1951     W. B. ROGERS ET AL     2,560,480
HOPPER SHAKER PLATE AND COMB ASSEMBLY
Filed May 13, 1947
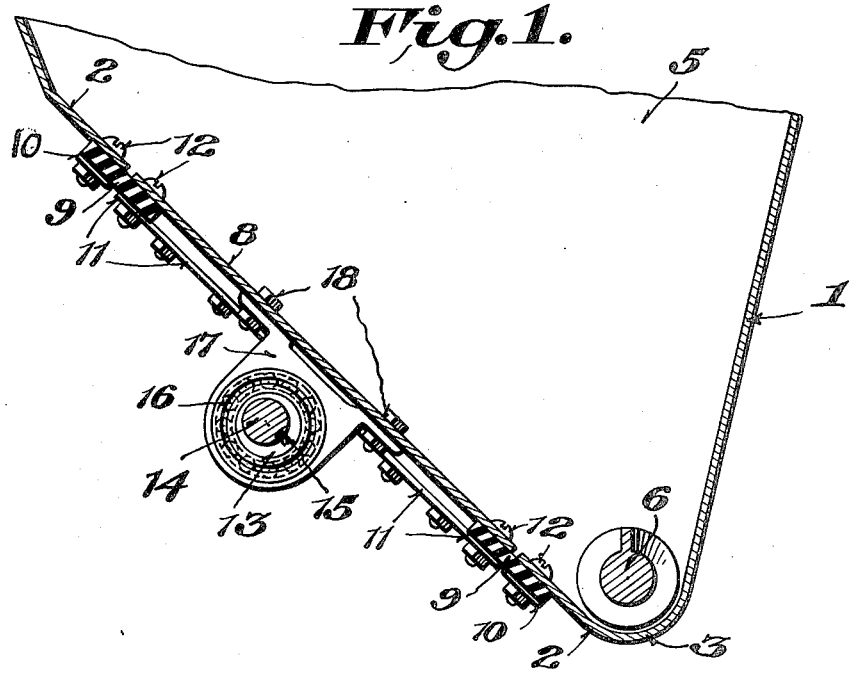
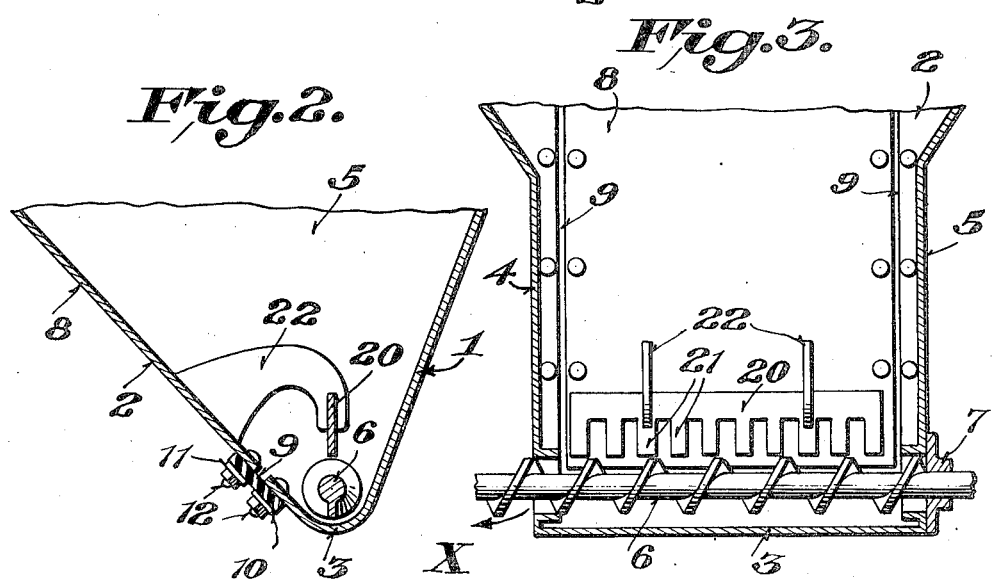

Patented July 10, 1951

2,560,480

UNITED STATES PATENT OFFICE 2,560,480

HOPPER SHAKER PLATE AND COMB ASSEMBLY

William B. Rogers and Everett D. Coffin, Baltimore, Md., assignors to John B. Rogers, Pasadena, Md.

Application May 13, 1947, Serial No. 747,752

4 Claims. (Cl. 222—200)

Our invention is a novel shaker plate and comb assembly for use in connection with hoppers for feeding pulverizing materials, particularly those adapted for feeding pulverized or powdered coal or the like to burners for domestic or other uses, the present application being an improvement upon the hopper agitating means shown and disclosed in U. S. Letters Patent of William B. Rogers No. 2,317,643 issued April 27, 1943.

The principal object of our present invention is to provide a hopper agitating means for properly feeding amounts of powdered coal or other powdered material smoothly and evenly into the air currents moving toward a burner or the like, so that the coal will be mixed perfectly with the air, said means vibrating or agitating the coal directly over the conveyor screw in the contracted lower end of the hopper to create a uniform fluffiness in the mass of coal at this point, and also vibrating an inclined side wall of the hopper to cause the coal therein to slide down properly toward the conveyor screw, thereby eliminating so-called "tunneling" of the coal in the hopper around and adjacent the said conveyor screw.

We will explain the invention with reference to the accompanying drawing, which illustrates one practical embodiment thereof to enable others familiar with the art to adopt and use the same; and we will summarize in the claims the novel features of construction and novel combination of parts, for which protection is desired.

In said drawings:

Figure 1 is a vertical section through a hopper, indicating the conveyor screw at the lower contracted end thereof, and indicating the shaker plate found in one side of the hopper.

Fig. 2 is a sectional view similar to Fig. 1, showing the comb assembly mounted upon the shaker plate of the hopper.

Fig. 3 is a longitudinal section through the hopper, showing the shaker plate and the comb which operates adjacent to and above the conveyor screw.

As shown, the hopper is of conventional shape, having side walls converging toward the bottom, side wall 1 being disposed at a substantially vertical angle but may be of any desired angularity, while the opposite side wall 2 is disposed at a less inclination to the vertical than wall 1, the juncture between the walls 1 and 2 being rounded, as at 3. The hopper is also provided with end plates 4 and 5 (Fig. 3), one end plate 4 having an opening through which the conveyor screw 6 passes, while the opposite end plate 5 preferably carries a bearing 7 for the conveyor screw which is adapted to move the contents of the hopper in the direction of the arrow X (Fig. 3). The particular construction of the hopper and of its supporting means forms no part of my present invention. The hopper is adapted to hold powdered coal or like pulverized dry material which is to be fed to the point of utilization by the conveyor screw 6.

The hopper side wall 2 is provided with a shaker plate 8 preferably of rectangular shape, plate 8 being of somewhat smaller area than the opening in side wall 2 in which same is fitted, shaker plate 8 being secured in the opening in wall 2 by means of a rubber gasket 9 bridging the gap between the wall 2 and plate 8, said gasket 9 having metallic frames 10, 11 on its outer face through which retaining bolts 12 or the like are passed, thereby securely clamping the gasket 9 between the wall 2 and plate 8 and the frames 10, 11. The shaker plate 8 is thus held within the rectangular opening of wall 2 of the hopper by the rubber gasket 9 secured to the edges of the plate 8 and wall 2 by the frames 10 and 11, and thus the resiliency of the rubber gasket 9 allows the shaker plate 8 to vibrate freely within the rectangular opening in wall 2, the lower end of the plate 8 terminating adjacent the conveyor screw 6, as shown in Figs. 1 and 2.

On the outer side of shaker plate 8, adjacent the center thereof is an eccentric cam 13 which is fixed on an operating shaft 14 by a key 15 or the like, the cam 13 being disposed within ball bearings 16 in a housing 17, whereby, as the shaft 14 is rotated a vibrating or reciprocating motion is imparted to the housing 17 which, being fixed to the shaker plate 8 by bolts 18, imparts a vibratory or reciprocating motion to the shaker plate 8. Preferably the shaker plate 8 is of such size that in effect one whole side of the hopper down to the conveyor screw 6 will shake or vibrate according to the speed of rotation of the operating shaft 14 of the eccentric cam 13, the operating shaft 14 being held rigidly in bearings (not shown) mounted on each side of the housing 17 detached from the shaker plate 8, the shaft 14 being thus rigidly mounted with respect to the shaker plate 8. The motive power for the shaft 14 may be the same source that drives the conveyor screw 6, or may be derived from an independent source, as desired.

By the above construction, when the shaft 14 is rotated, the pulverized coal or other dry granulated material in the hopper will be fed by vibration downwardly and positively toward the conveyor screw 6, eliminating the formation of any pockets or tunneling of the coal in the hopper around and adjacent the conveyor screw 6.

In connection with the shaker plate we also provide a comb assembly, shown in Figs. 2 and 3, which comb we have found to be necessary for proper feeding pulverized coal for combustion in a steady, uninterrupted stream. We have found that the comb shown in Figs. 2 and 3 will feed the fuel in an almost perfectly even flow as possible into an air emanating from a centrifugal blower, any unevenness in the flow or stream of pulverized coal at the point where we bring it into the primary air being multiplied 13,000 times in the combustion chamber. Therefore, to obtain the desired even feed, it is necessary not only to vibrate the coal down on to the conveyor screw 6 by the shaker plate 8, but also to create a constant fluffed condition in the material just above the conveyor screw. To obtain such constant fluffed condition, we have devised the comb illustrated in Figs. 2 and 3.

As shown, the comb 20 comprises a plate having teeth 21 depending from its lower edge terminating adjacent the screw 6 and extending substantially the full length of the hopper (Fig. 3). Comb 20 is attached to shaker plate 8 by means of sturdy brackets 22 illustrated in Fig. 3, the brackets 22 transmitting the motion of shaker plate 8 to the comb 20. The vibration of comb 20, disposed just above the conveyor screw 6, creates what we describe as a "fluffed" condition in the pulverized coal at this point which insures the desired constant condition of the material at the point where it feeds down into the flights of the conveyor screw 6.

The combination of shaker plate 8 and comb 20 may be used with hoppers for feeding any other finely-divided solid material where a steady feed is required. If desired, the comb 20 could be actuated separately from the shaker plate 8, utilizing a magnetic vibrator instead of being attached to the shaker plate 8.

In operation

When the shaker plate 8 is being vibrated by the mechanism 13, 14 shown, the motion is transmitted to the comb 20 by the brackets 22. The comb 20 is attached to the brackets 22 in such a manner that the comb 20 vibrates or moves back and forward rapidly just immediately above the feed conveyor screw 6, and this action creates a fluffed or constant condition at this point in the coal or other material, which condition is necessary in order to feed the material out of the hopper evenly or in as nearly a perfectly even flow or stream as it is possible to attain.

We do not limit our invention to the exact form shown in the drawing, for obviously changes may be made therein within the scope of the claims.

We claim:

1. In a hopper for pulverized solid materials, having side walls converging towards its lower end, and having a conveyor screw journaled in its lower end for moving said material axially thereof; one side wall having an opening therein terminating adjacent said screw; a shaker plate in said opening; resilient means connecting the plate to its related side wall adjacent the opening, said resilient means comprising a rubber strip around the opening bridging the gap between the plate and wall; frame members overlying the sides of the strip; and members transfixing the frames, strip, plate and wall respectively to clamp the sides of the strip between the frames, plate and wall at opposite sides of the gap, and means for vibrating the plate said vibrating means comprising a shaft fixedly journaled adjacent the shaker plate; an eccentric cam on said shaft; and a housing on said shaker plate in which the cam is rotatably mounted; whereby when the shaft is rotated the shaker plate will be vibrated.

2. In a hopper for pulverized solid materials, having side walls converging towards its lower end, and having a conveyor screw journaled in its lower end for moving said material axially thereof; one side wall having an opening therein terminating adjacent said screw; a shaker plate in said opening; resilient means connecting the plate to its related side wall adjacent the opening, said resilient means comprising a rubber strip around the opening bridging the gap between the plate and wall; frame members overlying the sides of the strip; and members transfixing the frames, strip, plate and wall respectively to clamp the sides of the strip between the frames, plate and wall at opposite sides of the gap, and means for vibrating the plate said vibrating means comprising a shaft fixedly journaled adjacent the shaker plate; an eccentric cam on said shaft; a housing on said shaker plate opposite the same; and anti-friction bearings between the cam and housing, whereby as the shaft is rotated the shaker plate will be vibrated.

3. In a hopper for pulverized solid material, having side walls converging toward its lower end; and having a conveyor screw journaled in its lower end for moving said material axially thereof; one side wall having an opening therein terminating adjacent said screw; a shaker plate in said opening; resilient means connecting the plate to its related side wall adjacent the opening; means for vibrating the plate; a comb rigidly mounted on the plate and having teeth disposed adjacent the top of the screw, said vibrating means comprising a shaft fixedly journaled adjacent the shaker plate; an eccentric cam on said shaft; and a housing on said shaker plate in which the cam is rotatably mounted; whereby when the shaft is rotated the shaker plate will be vibrated.

4. In a hopper for pulverized solid material, having side walls converging toward its lower end; and having a conveyor screw journaled in its lower end for moving said material axially thereof; one side wall having an opening therein terminating adjacent said screw; a shaker plate in said opening; resilient means connecting the plate to its related side wall adjacent the opening; means for vibrating the plate; a comb rigidly mounted on the plate and having teeth disposed adjacent the top of the screw, said vibrating means comprising a shaft fixedly journaled adjacent the the shaker plate; an eccentric cam on said shaft; a housing on said shaker plate opposite the same; and anti-friction bearings between the cam and housing, whereby as the shaft is rotated the shaker plate will be vibrated.

WILLIAM B. ROGERS.
EVERETT D. COFFIN.

REFERENCES CITED

The following references are of record in the file of this patent:

UNITED STATES PATENTS

| Number | Name | Date |
|---|---|---|
| 1,545,376 | Weatherby | July 7, 1925 |
| 1,729,032 | Cross | Sept. 24, 1929 |
| 2,025,184 | Twose | Dec. 24, 1935 |
| 2,246,497 | Beck | June 24, 1941 |
| 2,317,643 | Rogers | Apr. 27, 1943 |
| 2,381,802 | Booth et al. | Aug. 7, 1945 |